United States Patent [19]

French et al.

[11] Patent Number: 5,649,181

[45] Date of Patent: Jul. 15, 1997

[54] METHOD AND APPARATUS FOR INDEXING DATABASE COLUMNS WITH BIT VECTORS

[75] Inventors: Clark French, Pepperell; Peter W. White, Andover, both of Mass.

[73] Assignee: Sybase, Inc., Emeryville, Calif.

[21] Appl. No.: 627,060

[22] Filed: Apr. 3, 1996

Related U.S. Application Data

[63] Continuation of Ser. No. 48,637, Apr. 16, 1993, abandoned.

[51] Int. Cl.$^6$ ................................................. G06F 17/30
[52] U.S. Cl. ..................... 395/603; 395/602; 395/606; 395/235; 364/255.2; 364/283.4; 364/DIG. 1
[58] Field of Search ............................... 395/600, 602, 395/603, 606, 235; 364/DIG. 1

[56] References Cited

U.S. PATENT DOCUMENTS

| | | | |
|---|---|---|---|
| 4,606,002 | 8/1986 | Waisman et al. | 395/600 |
| 4,677,550 | 6/1987 | Ferguson | 395/600 |
| 4,776,026 | 10/1988 | Ueyama | 382/46 |
| 5,153,591 | 10/1992 | Clark | 341/51 |
| 5,293,616 | 3/1994 | Flint | 395/600 |
| 5,377,348 | 12/1994 | Lau et al. | 395/600 |
| 5,404,510 | 4/1995 | Smith et al. | 395/600 |
| 5,495,608 | 2/1996 | Antoshenkov | 395/600 |

OTHER PUBLICATIONS

"Domain Vector Accelerator (DVA): A query Accelerator for Relational Operations", Perrizo et al., IBM Corp., Rochester MN, IEEE, Data Engneering, 1991 7th Int'l, pp. 491–498 Dec. 1990.

Reinartz, K.D., "Aspects of Vertical Mode in Multiprocessor Systems, Unconventional Computation on conventional Processors", Second International Specialist Seminar on the Design and Application of Parallel Dirital Procesors, IEE, 1991, pp. 48–54.

Brodie et al. "Database Management: A Survey" pp. 1–24. May, 1987.

Hanson–Smith, "Advantage Series System Overview", Version 2.0 pp. 1–132. 1990.

*Primary Examiner*—Thomas G. Black
*Assistant Examiner*—Hosain T. Alam
*Attorney, Agent, or Firm*—John A. Smart; David N. Slone

[57] ABSTRACT

A server performs an indexing method of data management to create and maintain indexes more efficiently than existing indexing approaches. The server is disposed between an application program and a DBMS and is coupled to a data base located within the DBMS. The data base has an ordered set of data values stored in memory. Each data value has a bit pattern and an identifier associated therewith. The server creates a plurality of bit vectors such that the number of bit vectors created equals the longest length bit pattern for the values. The server accesses one of the values stored in the data base. Each bit of the bit pattern for the value is then assigned by the server to a unique position in successive bit vectors. The bits are assigned to identical unique positions in each of the successive bit vectors. The server repeats the above-described accessing and assigning steps for each remaining value of the set to form an index of bit vectors for the values.

45 Claims, 3 Drawing Sheets

METHOD AND APPARATUS FOR INDEXING DATABASE COLUMNS WITH BIT VECTORS

This is a file-wrapper continuation patent application of Ser. No. 08/048,637, file Apr. 16, 1993 now abandoned.

BACKGROUND OF THE INVENTION

A data base has been define as a collection of data that can be concurrently shared and used by multiple applications. Data bases have evolved from simple file systems to massive collections of data serving a community of users and numerous distinct applications.

The data disposed within a data base can be organized as a plurality of records. Each record typically includes data values for one or more common categories of information. For example, each of a plurality of records may include information (i.e. data values) for the following categories: a person's name, address, age, gender, telephone number, account numbers and credit limits.

One important data base tool is the data base management system (DBMS). A DBMS is a data processor which aids in the storage, manipulation, reporting, management and control of the data base. Since the 1970's, DBMSs have become widely used and are becoming the main technology for general purpose data base management.

One purpose of a DBMS is to answer decision support queries and support transactions. A query may be defined as a logical expression over the data and the data relationships set forth in the data base, and results in identification of a subset of the data base. For example, a typical query for the above-noted data base might be a request for data values corresponding to all customers having account balances above required limits. A transaction includes several query and altering operations over data and is used to define application events or operations.

A DBMS typically utilizes one or more indexes to answer queries. Indexes are organized structures, created by a data base administrator, associated with the data to speed up access to particular data values (i.e. answer values). Indexes are usually stored in the data base and are accessible to a data base administrator as well as end users.

One indexing approach is based on a structure known as the B-tree. A B-tree index is a multi-level, tree-structured index in which all leaf entries (i.e. data values) in the structure are equidistant from the root of the tree. As a result, the B-tree index provides uniform and predictable performance for retrieval operations. A B-tree index includes a root page, zero or more intermediate pages and a set of leaf pages. The leaf level includes an entry for each unique value of the indexed data, providing the indexed value and an indication (typically a row identifier) for each data base record that contains the value. Each level above the leaf level contains an index entry for every page of the level below. Thus, the B-tree structure provides relatively fast, direct access to the leaf pages and hence, the indexed data.

Another indexing approach, which is a refinement of B-tree indexing, is known as the keyword indexing. In this approach, a modified B-tree is formed for the unique values of a group of data values. More specifically, the B-tree has only the unique values at the leaf level with a bit map associated with each unique value. For example, consider a block of data having fifty thousand records (i.e. distinct rows of data) which indicate, among other things, gender for each of fifty thousand people. In this situation, there are three unique values: male, female and undefined. Thus, three bit maps would be generated, one each for male, female and undefined. Each bit map would have fifty thousand bits, with ONE bits at locations corresponding to those people with that gender and ZERO bits at locations corresponding to those people having another gender.

Existing indexing approaches, such as those described above, are not without problems. For example, the B-tree indexing approach typically requires a substantial period of time for creating the indexes. Once created, existing B-tree indexes occupy a large portion (e.g. 250% of the space allotted for the data) of memory. Additionally, B-tree indexes are not always fast enough for decision support queries on large-scale DBMSs.

SUMMARY OF THE INVENTION

The present invention, in general, is directed to an index method and apparatus for creating and maintaining indexes in a more efficient manner than existing indexing approaches. Consequently, indexes can be formed in less time and occupy less space in memory with the present approach than with known indexing approaches, particularly for medium cardinality data (i.e. about one hundred to eighty thousand unique data values) and high cardinality data (i.e. about eighty thousand plus unique data values). As such, decision support queries can be processed faster (i.e., up to one hundred times faster) than in existing index approaches. Further, the present index method and apparatus provide seamless technology that enhances the capabilities of existing DBMSs, particularly when employed with large data base systems (i.e., greater than one million records) and used for decision support queries.

More specifically, the present invention features a server for performing an index method of data management. The server is disposed between a processor running an application program and a DBMS and is coupled to a data base located within the DBMS. The data base has an ordered set of data values stored in memory. The set of data values may, for example, correspond to numbered rows of complete records or numbered rows of a subset (i.e., one or more columns) of the records. Each data value has a bit pattern and a unique identifier (e.g., a row identification number) associated therewith.

In accordance with the present indexing method, the server performs the step of creating a plurality of bit vectors. Preferably, the number of bit vectors created equals the length of the longest bit pattern for the values. Preferably, each bit vector initially has the same value (i.e. ZERO or ONE) in each bit location. The server subsequently performs the step of accessing one of the values stored in the data base. The server then performs the step of assigning each bit of the bit pattern for the value, preferably from the most significant bit to the least significant bit, to a unique position in successive bit vectors. The bits are assigned to identical unique positions in each of the successive bit vectors. For example, for a first value, each bit is assigned to the first bit position for each bit vector. The server repeats the above-described accessing and assigning steps for each remaining value of the set to form an index of bit vectors for the values.

Using the above-described method, a complete set of indexes can be formed that is more compact and efficient than known indexes used by DBMS manufacturers. These highly efficient indexes allow for fast retrieval and/or reconstruction of answer data values in response to queries. Further, using the present method, a user can create indexes customized to the cardinality (i.e. low, medium or high) of the data and/or the types of queries to be performed.

BRIEF DESCRIPTION OF THE DRAWINGS

The foregoing summary of the invention, and the various features thereof, as well as the invention itself may be more fully understood from the following detailed description when read together with the accompanying drawings.

DETAILED DESCRIPTION OF THE INVENTION

The present invention features an indexing method and apparatus for creating and maintaining indexes for data in a more efficient manner than existing indexing approaches. Indexes can be formed in less time and occupy less space in memory with the present approach than with known indexing approaches, particularly for medium and high cardinality data. As such, decision support queries can be processed up to one hundred times faster than in existing index approaches.

Figure 1:
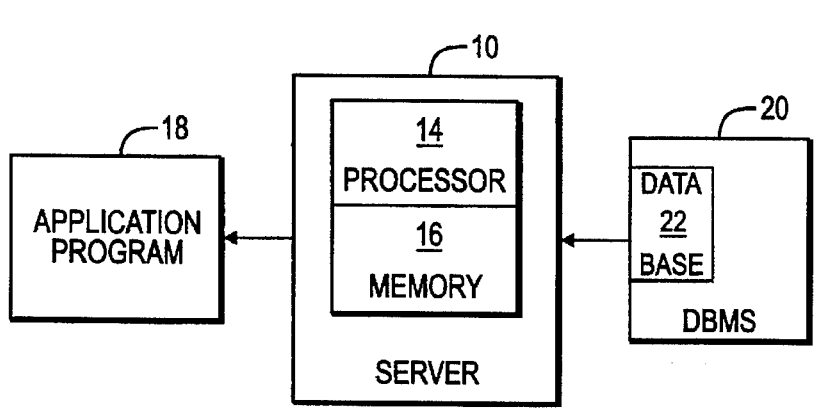
FIG. 1 is a block diagram of a data processing system incorporating the indexing approach of the present invention.

Referring to FIG. 1, the present invention features a server 10 for creating an index for data management within the data processing system 12. The server 10, which may be simply a set of software instructions stored on a disk or in memory, comprises a processor 14 and a memory 16 for storing each index created by the processor. Preferably, the server 10 is disposed between a processor 10 running an application program 18 and a data base management system (DBMS) 20. The processor 18 includes the hardware and software necessary to provide a user interface to the DBMS 20. The DBMS, which may be any backend data base (e.g., Sybase or Oracle), includes a data base 22 to which the server 10 is coupled.

Figure 2:
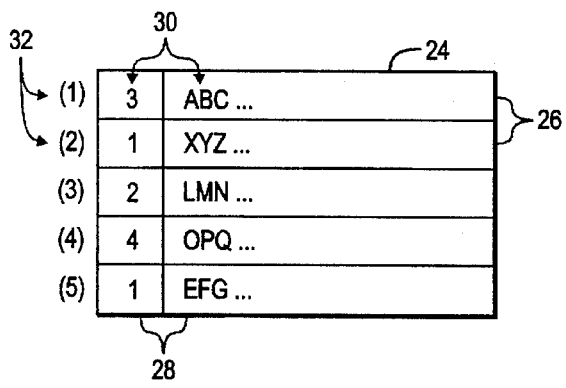
FIG. 2 is a flow chart illustrating process steps for forming an index in accordance with the present method.

Referring to FIG. 2, the data base 22 can include an ordered set of data values stored in the memory 24. The set of data values may correspond to numbered rows 26 of complete records or of one or more columns 28 of the records. Each data value 30 has a bit pattern and a unique identifier 32 (i.e., a row identification number) associated therewith. In this example, all of the data values 30 in a given column 28 have bit patterns of the same length. In general, the data values need not have the same length.

Figure 3:
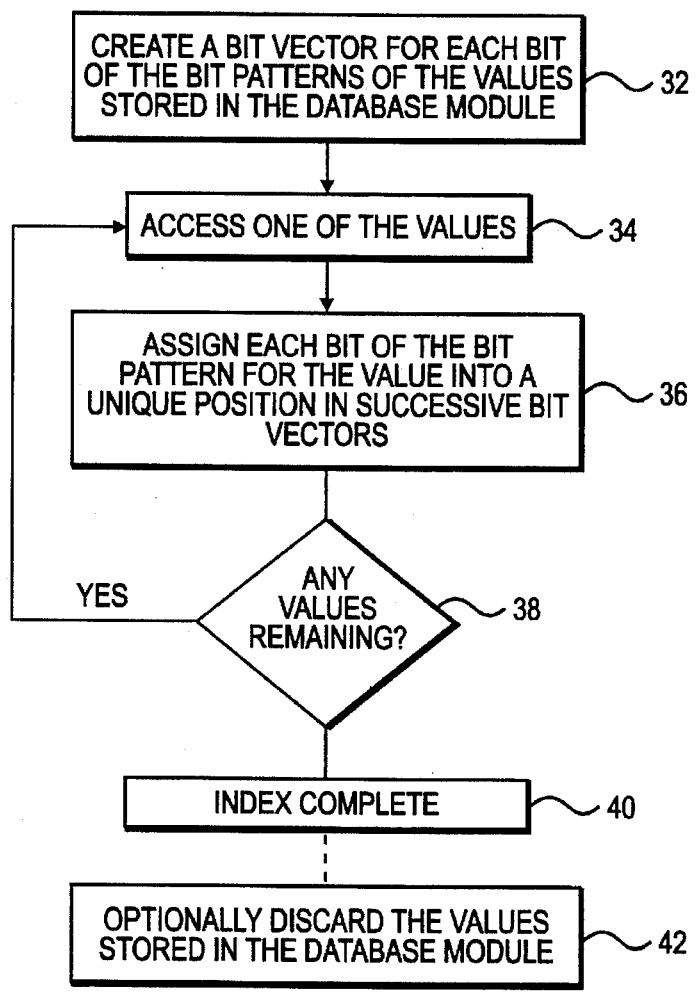
FIG. 3 is an illustration of a sample data base including multiple columns of data values.
Figure 4:
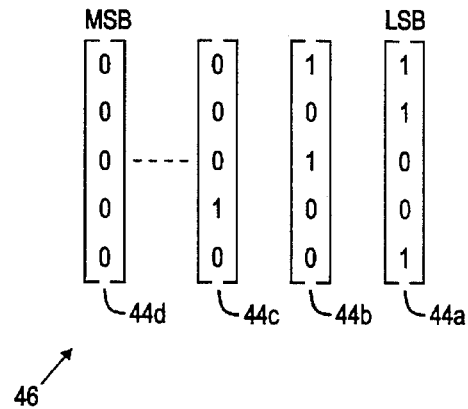
FIG. 4 is a sample index of bit vectors created in accordance with the present method.

Referring to FIG. 3, the server 10 performs the processing steps for creating an index of bit vectors (see FIG. 4). As shown, the processing steps include: creating a plurality of bit vectors such that the number of bit vectors created equals the length of the longest bit pattern for the values (step 32); accessing one of the values stored in the data base (step 34); assigning each bit of the bit pattern for that value, from the most significant bit to the least significant bit, to a unique position in successive bit vectors (step 36); repeating the above-described accessing and assigning steps for each remaining value of the set to form an index of bit vectors for the values (steps 38,40); and optionally discarding the ordered set of values stored in the data base (steps 42).

Referring to FIG. 4, the present method can be employed to create an index for the left-hand column of data values (i.e. the numbers) shown in FIG. 2. Accordingly, the server 10 first creates a plurality of bit vectors 44a–44d. The number of bit vectors created equals the length of the bit patterns for the values (i.e. the numbers). For example, if the memory allocates 32 bits per character (or digit) for each value, then 32 bit vectors are created. Preferably, each bit vector initially has all ZEROES in each bit location.

The server then performs the step of accessing the first value (i.e. the number 3) stored in the memory 24. Each value in the memory 24 is represented, in this example, by a 32-bit bit pattern. Thus, the number 3 has a bit pattern 0 . . . 011. Next, each bit of the bit pattern from the most significant bit to the least significant bit is assigned by the server to the first position in each of the bit vectors 44a–44d. In other words, the most significant bit for the number 3 is assigned to the first position of the first vector 44d and the least significant bit is assigned to the first position of the last bit vector 44a.

The server determines whether any unaccessed values remain in the memory 24. Since four numbers remain, the above-described accessing and assigning steps are repeated for each remaining number to form an index 46 of bit vectors for the numbers. The server may also perform a data compression step for reducing the data stored in the data base. To that end, the server may discard or erase the column of numbers or the entire contents of the memory 24 subsequent to the formation of a complete set of indexes.

Using the present method, the server can form a complete set of indexes that are more compact and efficient than known indexes used by DBMS manufacturers, programmers and users. These highly efficient indexes enable the server to quickly retrieve and/or reconstruct answer data values in response to queries.

Figure 5:
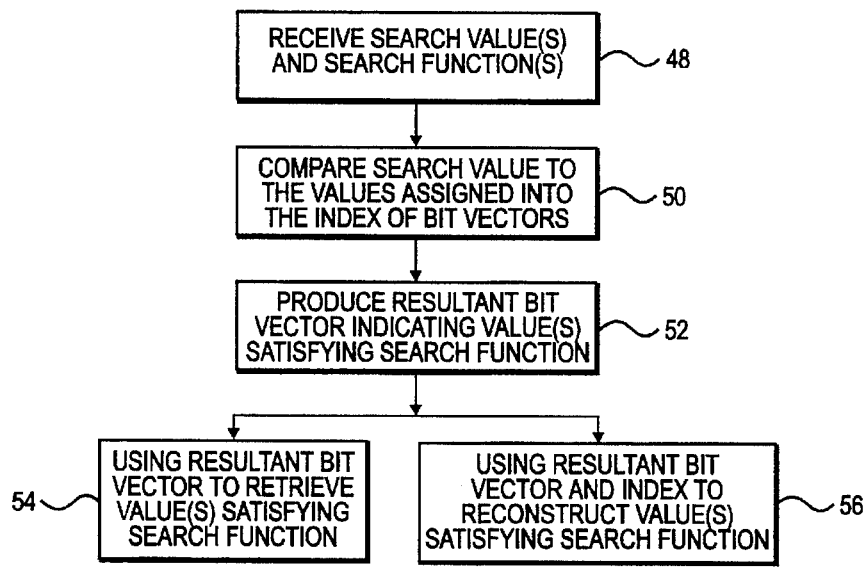
FIG. 5 is a flow chart illustrating process steps for retrieving or reconstructing data values in response to a query using the present method.

To that end, the present method can also include additional processing steps enabling fast response/retrieval to one or more decision support queries. Referring to FIG. 5, the server may be equipped to perform the following processing steps: receiving from the application program a query, including a search value and a search function (e.g., <, >, =, etc.), from the application program (step 48); performing, in response to the query, a comparison of the search value to each bit vector in the designated index (step 50); and producing a resultant bit vector having a bit pattern which indicates the unique identifier of each value satisfying the search function (step 52). The server can utilize the resultant bit vector to perform the step of retrieving from the data base each data value satisfying the search function (step 54). Alternatively, the server can perform the step of reconstructing from the index each data value satisfying the search function (step 56). Using either approach, the server can then provide the retrieved or reconstructed values to the application program.

Figures 6, 7:
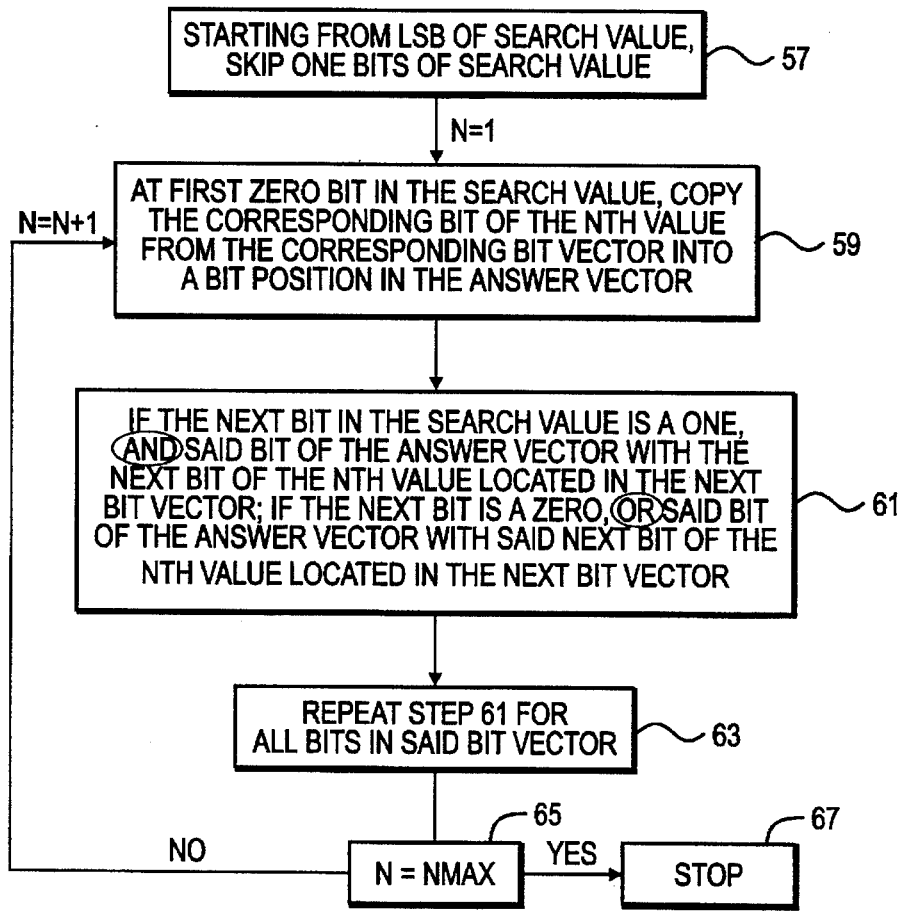
FIG. 6 is a chart illustrating the results of a sample query performed using the present method.
FIG. 7 is a flow chart illustrating process steps for comparing a search value to data values assigned into an index.

With reference to FIGS. 6–7, the method steps of FIG. 5 can be employed in the server to search the index 46 for retrieving and/or reconstructing those data values greater than a search value (i.e. the number 1) as shown in FIG. 6. As shown, the 32-bit bit pattern for the number 1 is 0 . . . 001. The server receives a query from, for example, the application program. The query may be a request for those data values in the index 46 which are greater than the number 1. Responsive to the query, the server compares the number 1 to each of the values assigned into the index. This comparison step is performed by manipulating the bit vectors 44a–44d, including performing Boolean functions on selected bit vectors, based on the search value and the search function.

In this example, the comparison step is performed in accordance with the flow chart shown in FIG. 7. With reference to FIGS. 6 and 7, beginning with the first value (i.e. N=1) and starting from the least significant bit of the search value, ONE bits are skipped (step 57). Thus, the least significant bit of the search value is skipped such that the first position of the answer vector 58 is blank. Next, beginning with the least significant ZERO bit in the search value, the corresponding bit of the first value, located in the corresponding bit vector, is copied into the first position of the second answer vector 60 (step 59). Since the second bit for the number 1 is a ZERO, the second bit (i.e. 1) of the the first value (i.e. 3) of the vector 44b is copied into the first position of the answer vector 60. If the next bit in the search value is a ONE, the next bit of the first value, which is located in the first position of the next bit vector, is ANDed with the bit located in the first position of the answer vector 60; alternatively, if the next bit in the search value is a ZERO, the next bit of the first value is ORed with the bit in the first position of the answer vector 60 (step 61). In this example, the next bit (i.e. the third bit) of the first value is a ZERO, so that ZERO bit is ANDed with ONE bit in the first position of vector 60 and the result is listed in the first position of the answer vector 62. The AND/OR step is subsequently repeated for the first value until all 32 bits have been compared to the bits of the search value (step 63). Next, it is determined whether the vectors include any additional data values (step 63). If they do, the comparison steps (steps 59–63) are repeated for next data value. Once the comparison is performed on all data values, the process is stopped.

After the comparison is complete, the server produces a resultant bit vector 64 having a bit pattern which indicates (via ONEs in appropriate bit positions corresponding to the row identifiers) the numbers satisfying the search function. As shown, the first third and fourth numbers in the memory satisfy the search function (i.e. numbers greater than 1).

The server can utilize the resultant bit vector 64 to retrieve from the memory 24 (FIG. 2) each number satisfying the search. To that end, the server would retrieve the numbers stored in those rows of the first column of the memory indicated in the bit pattern of the resultant vector 64. Alternatively, the server may reconstruct from the index those numbers satisfying the search. The server selects the first bit of each bit vector to reconstruct the number corresponding that which is stored in the first row of the memory 24 (FIG. 2). Similarly, the server selects the third and fourth bits of each bit vector to reconstruct the numbers corresponding those stored in the third and fourth rows of memory. With this approach, the server does not have to access the memory 24 to respond to a query. Using either approach, the server can then provide the retrieved or reconstructed values to the application program.

The speed of searching indexed data can depend on, for example, the cardninality of the data, the complexity of the search query, etc. Accordingly, the present method allows a user to select the type of index to be formed. As such, a user can form a B-tree index or a bit vector index depending upon such factors as the cardinality of the data, the data base size and the query.

While various embodiments of the invention have been set forth in detail, it should be understood that the above description is intended as illustrative rather than limiting and that many variations to the described embodiments will be apparent to those skilled in the art. The invention is to be described, therefore, not by the preceding description, but by the claims that follow.

What is claimed is:

1. A method for data management in a data processing system comprising the steps of:
   in a database comprising a database table having data arranged as an ordered set in row and column format, storing said data as a sequence of rows of data records, each data record having data values categorized by column, each data value having a bit pattern of arbitrary length and an identifier associated therewith;
   creating an index of bit vectors by forming from data records of a particular column a number of bit vectors, each bit vector comprising bit values taken from a single bit position for said particular column of said database table, wherein:
   (i) the number of bit vectors so created is equal to the length of the longest of the bit patterns for the data values for said particular column; and
   (ii) the length of each bit vector is equal to the number of data values for said particular column;
   said creating step including the substeps of:
   accessing each one of the rows of data records in the database,
   for the row being accessed assigning to a unique position in successive bit vectors each bit of the bit pattern for the data value of said particular column, each bit being assigned to an identical unique position in each of the successive bit vectors; and
   compressing data values of said sequence of rows of data records which are also stored in said index of bit vectors.

2. The method of claim 1 further comprising the steps of:
   receiving a search value and a search function from an application program;
   comparing the search value to the index of bit vectors for the values by manipulation of the bit vectors based on the search value and the search function; and
   producing a resultant bit vector having a bit pattern indicating the identifier of each value satisfying the search function.

3. The method of claim 2 further comprising the steps of:
   retrieving from the data base each value associated with each identifier indicated in the bit pattern of the resultant vector; and
   providing each retrieved value to the application program.

4. The method of claim 2 further comprising the step of reconstructing each data value associated with each identifier indicated in the bit pattern of the resultant bit vector by selecting each bit, in each successive bit vector of the index, having a unique position corresponding to said identifier.

5. The method of claim 2 wherein the manipulation of the bit vectors comprises performing Boolean functions on selected bit vectors based on the search value and the search function.

6. The method of claim 1 wherein the compression step further comprises discarding the ordered set of values from the database and any bit vectors having bit values all equal to zero.

7. The method of claim 1 wherein the data records comprise medium or high cardinality data.

8. The method of claim 1 further comprising the steps of:
   providing another ordered set of values stored in the data base;
   accessing the other ordered set of values; and
   forming a B-tree index for the other ordered set of values.

9. The method of claim 8 wherein the other ordered set of values corresponds to low cardinality data.

10. The method of claim 8 further comprising the steps of:
   performing, for each ordered set of values corresponding to medium or high cardinality data, the processing steps necessary to form an index of bit vectors; and
   performing, for an ordered set of values corresponding to low cardinality data, the processing steps necessary to form a B-tree index.

11. The method of claim 8 further comprising the step of performing, based on the cardinality of a particular ordered set of values, either the processing steps necessary to form an index of bit vectors or the processing steps necessary to form a B-tree index.

12. An index method of data management in a data processing system, the method comprising:
   providing an application program, a database management system and a server;
   forming an index of bit vectors in the server, the index being formed from an ordered set of data values disposed in a database of the database management system as a plurality of data records arranged in row and column format, each data value disposed in the database having a bit pattern of arbitrary length and an identifier for a particular column associated therewith, the index being formed by:
   (i) creating a number of bit vectors, wherein the number of bit vectors is equal to the length of the longest of the bit patterns for the data values and the length of each bit vector is equal to the number of data values;
   (ii) assigning to a unique position in successive bit vectors each bit of the bit pattern for each data value, wherein each bit of the bit pattern for each data value is assigned to identical unique position in each of the successive bit vectors;
   so that each bit vector comprises an array storing a transposed sequence of bit values derived by taking a single bit value for each record of said database table, each bit vector comprising bit values taken from a single bit position for said particular column of said database table;
   receiving a search value and a search function from the application program;
   comparing the search value to the data values assigned into the bit vectors by manipulation of the bit vectors based on the search value and the search function;
   producing a resultant bit vector having a bit pattern indicating the identifier of one or more data values, thereby indicating that said one or more data values satisfy the search function; and
   compressing the ordered set of data values disposed in the database by deleting all data values which can be derived from said index of bit vectors.

13. The method of claim 12 further comprising the additional steps of:
   retrieving from the data base each value associated with each identifier indicated in the bit pattern of the resultant vector; and
   providing each retrieved value to the application program.

14. The method of claim 12 further comprising the additional steps of:
   reconstructing each data value associated with each identifier indicated in the bit pattern of the resultant bit vector by selecting each bit, in each successive bit vector of the index, having a unique position corresponding to said identifier; and
   providing each reconstructed data value to the application program.

15. The method of claim 12 wherein the manipulation of the bit vectors comprises performing Boolean functions on selected bit vectors based on the search value and the search function.

16. The method of claim 12 wherein the compression step further comprises discarding any bit vectors having bit values all equal to zero.

17. The method of claim 12 wherein the ordered set of values corresponds to medium or high cardinality data.

18. The method of claim 12 further comprising the additional steps of:
   providing another ordered set of data values stored in the data base;
   accessing said other ordered set of values; and
   forming a B-tree index for the other ordered set of values.

19. The method of claim 18 wherein the other ordered set of values corresponds to low cardinality data.

20. A database management system comprising:
   a server having a database comprising an ordered set of data values stored as a plurality of data records arranged in row and column format, each data value having a bit pattern and an identifier associated therewith, the server comprising a memory, and a processor;
   means for creating a number of bit vectors in the memory, such that the number of bit vectors is equal to the length of the longest of the bit patterns for the data values and the length of each bit vector is equal to the number of data values;
   means for accessing one of the ordered set of data values stored in the database;
   means for assigning each successive bit of the bit pattern for the accessed data value to a unique position in successive bit vectors, the bits being assigned into an identical unique position in each of the successive bit vectors, so that each bit vector comprises an array storing a column of bit values created by taking a single bit value at a particular unique bit position of one column for each record of said database table;
   means for repeating the accessing and assigning steps for each remaining data value to form an index of bit vectors for the data values; and
   means for compressing the ordered set of data values disposed in the database by eliminating data values which can be derived from said bit vectors.

21. The data base management system of claim 20 further comprising:
   means for receiving a search value and a search function from an application program;
   means for comparing the search value to the index of bit vectors for the values by manipulation of the bit vectors based on the search value and the search function; and
   means for producing a resultant bit vector having a bit pattern indicating the identifier of each value satisfying the search function.

22. The data base management system of claim 21 further comprising:
   means for retrieving from the data base each value associated with each identifier indicated in the bit pattern of the resultant vector; and
   means for providing each retrieved value to the application program.

23. The data base management system of claim 21 further comprising means for reconstructing each data value associated with each identifier indicated in the bit pattern of the resultant bit vector by selecting each bit, in each successive bit vector of the index, having a unique position corresponding to said identifier.

24. The database management system of claim 20 wherein the means for compressing discards all of the ordered set of data values from the database.

25. The data base management system of claim 21 wherein the manipulation of the bit vectors comprises performing Boolean functions on selected bit vectors based on the search value and the search function.

26. The data base management system of claim 20 wherein the ordered set of data values corresponds to high cardinality data.

27. The data base management system of claim 26 further comprising means for accessing another ordered set of data values stored in the data base, and means for forming a B-tree index for the other ordered set of data values.

28. The data base management system of claim 27 wherein the other ordered set of data values corresponds to low cardinality data.

29. A method for data management in a data processing system comprising the steps of:
   storing a database comprising data arranged as an ordered set of data values in row and column format, each data value having a bit pattern of arbitrary length and an identifier associated therewith;
   creating a number of bit vectors, wherein the number of bit vectors is equal to the length of the longest of the bit patterns for the data values and the length of each bit vector is equal to the number of data values, said creating step comprising substeps of:
   (i) accessing one of the ordered set of data values stormed in the database;
   (ii) assigning to a unique position in successive bit vectors each bit of the bit pattern for said data value, each bit being assigned to an identical unique position in each of the successive bit vectors; and
   (iii) repeating the accessing and assigning steps for each remaining data value to form an index of bit vectors for the data values, so that each bit vector comprises an array storing a column of bit values created by taking a single bit value at a particular unique bit position of one column for each row of said database;
   receiving a search value and a search function from the application program;
   comparing the search value to the data values assigned into the bit vectors by manipulation of the bit vectors based on the search value and the search function;
   producing a resultant bit vector having a bit pattern indicating the identifier of one or more data values, thereby indicating that said one or more data values satisfy the search function; and
   reconstructing each data value associated with each identifier indicated in the bit pattern of the resultant bit vector by selecting each bit, in each successive bit vector of the index, having a unique position corresponding to said identifier.

30. The method of claim 29 further comprising the step of compressing the ordered set of data values disposed in the data base subsequent to the repeating step.

31. The method of claim 30 wherein the compressing step further comprises discarding those data values of the ordered set which can be derived from said bit vectors.

32. A database management system comprising:
   a server having a database storing an ordered set of data values as rows of data records, each data value having a bit pattern and an identifier for a particular database column associated therewith, the server comprising a memory and a processor;
   means for creating a number of bit vectors in the memory, such that the number of bit vectors is equal to the length of the longest of the bit patterns for the data values and the length of each bit vector is equal to the number of data values, said means for creating including:
   means for accessing one of the ordered set of data values stored in the database;
   means for assigning each bit of the bit pattern for the accessed data value to a unique position in successive bit vectors, the bits being assigned into an identical unique position in each of the successive bit vectors; and
   means for repeating the accessing and assigning steps for each remaining data value to form an index of bit vectors for the data values, so that each bit vector comprises an array storing a column of bit values created by taking a single bit value at a particular unique bit position of one column for each row of said database;
   means for receiving a search value and a search function from the application program;
   means for comparing the search value to the data values assigned into the bit vectors by manipulation of the bit vectors based on the search value and the search function;
   means for producing a resultant bit vector having a bit pattern indicating the identifier of one or more data values, thereby indicating that said one or more data values satisfy the search function; and
   means for reconstructing each data value associated with each identifier indicated in the bit pattern of the resultant bit vector by selecting each bit, in each successive bit vector of the index, having a unique position corresponding to said identifier.

33. The database management system of claim 32 further comprising means for compressing the ordered set of data values disposed in the database.

34. The database management system of claim 33 wherein the means for compressing discards any data values of the ordered set of values from the database which can be derived from said bit vectors.

35. In a database system comprising a database storing information in a database table as a sequence of data records arranged in row and column format, an improved method for indexing said database table, the method comprising:
   selecting a particular column of the database table to index, said particular column representing a particular category of information for which each data record stores a data value, each data value representing information in the database stored as a sequence of bit values, each bit value having a particular bit position in said sequence of bit values; and
   creating an index for said particular column comprising a plurality of bit vectors by performing substeps of:
   (i) determining a maximum number of bit positions employed in said sequence of bit values for storing information for said particular column,
   (ii) initializing a sequence of bit vectors based on said determined maximum number of bit positions, so that each bit vector is associated with a particular one of said bit positions employed, and
   (iii) copying data values stored for said particular column by said sequence of data records into said sequence of bit vectors, so that for each particular bit position at each particular data record any bit value stored thereat is copied into the bit vector associated with that bit position, the bit value being copied into a particular bit position of the bit vector which corresponds to position of the particular data record relative to other data records in said sequence of data records.

36. The method of claim 35, further comprising:

compressing the data values stored in said bit vectors by eliminating bit values which are unused by the data values.

37. The method of claim 36, wherein said compressing step comprises:

compressing the data values stored in said bit vectors by eliminating any bit vector having its bit values all set equal to 0.

38. The method of claim 36, wherein said particular column stores integer data values, and wherein said unused bit values comprise at least some high-order bits of the integer data values.

39. The method of claim 35, further comprising:

compressing the database table by eliminating data values of said particular column.

40. The method of claim 39, further comprising:

reconstructing said particular column by copying data values stored in said sequence of bit vectors back into said sequence of data records.

41. The method of claim 35, further comprising:

repeating said selecting and creating steps for another column of the database table.

42. The method of claim 35, wherein said category of information comprises medium or high cardinality data.

43. The method of claim 35, further comprising:

receiving a search value and a search function from an application program;

comparing the search value to the index of bit vectors of data values by manipulation of the vectors based on the search functions; and producing a resultant bit vector having a bit pattern indicating a record identifier for each data value satisfying the search function.

44. The method of claim 43, further comprising:

retrieving from the database each data record associated with each record identifier indicated in the bit pattern of the resultant vector; and providing each retrieved data record to the application program.

45. The method of claim 35, wherein:

each bit vector has a length equal to how many data values are present in the database table for said particular column.

* * * * *